United States Patent [19]

Kikuchi et al.

[11] 4,245,325
[45] Jan. 13, 1981

[54] DIGITAL MULTIFREQUENCY SIGNALLING RECEIVER

[75] Inventors: Shiro Kikuchi, Tokyo; Hitoshi Imagawa, Hachioji; Yasumasa Iwase, Tokorozawa, all of Japan

[73] Assignee: Nippon Telegraph and Telephone Public Corporation, Tokyo, Japan

[21] Appl. No.: 12,507

[22] Filed: Feb. 15, 1979

[30] Foreign Application Priority Data

Feb. 24, 1978 [JP] Japan .................................. 53-20751
Feb. 24, 1978 [JP] Japan .................................. 53-20752

[51] Int. Cl.³ ............................................ G06F 15/31
[52] U.S. Cl. ................................... 364/724; 370/23
[58] Field of Search ............... 364/724; 179/15 BY; 325/321; 324/77 B, 77 D; 370/23

[56] References Cited

U.S. PATENT DOCUMENTS

| | | | |
|---|---|---|---|
| Re. 29,460 | 10/1977 | Mills ..................................... | 364/724 |
| 3,803,390 | 4/1974 | Schaepman ........................... | 364/724 |
| 3,824,471 | 7/1974 | Mills ..................................... | 325/321 |
| 3,863,030 | 1/1975 | Mills ................................. | 179/15 BY |
| 3,976,843 | 8/1976 | Buchner et al. .................. | 179/15 BY |
| 4,021,653 | 5/1977 | Sharp et al. ......................... | 364/724 |
| 4,109,109 | 8/1978 | Molleron ........................ | 179/15 BY |

Primary Examiner—David H. Malzahn
Attorney, Agent, or Firm—Frishauf, Holtz, Goodman & Woodward

[57] ABSTRACT

Disclosed is a digital multifrequency signaling receiving system in which a first operation device executes an operation to multiply multifrequency signals composed of N samples as input signals by a window function including coefficients required for fast Fourier transform. An output produced at the first operation device, as a sample signal, is subjected to fast Fourier transformation at a second operation device which includes a subtractor and a logic circuit. In the subtractor, the sample signals are delayed N/2 samples to halve the number of sample signals. The logic circuit executes an operation for the sample signals, taking advantage of the fact that some frequencies of the outputs of the Fourier transform are represented as the conjugate complex of the other outputs of the Fourier transform. The sample signals fast-Fourier-transformed and produced at the second operation device are subjected discrete Fourier transformation in a processor, where an output for detecting the multifrequency signals is obtained.

14 Claims, 18 Drawing Figures

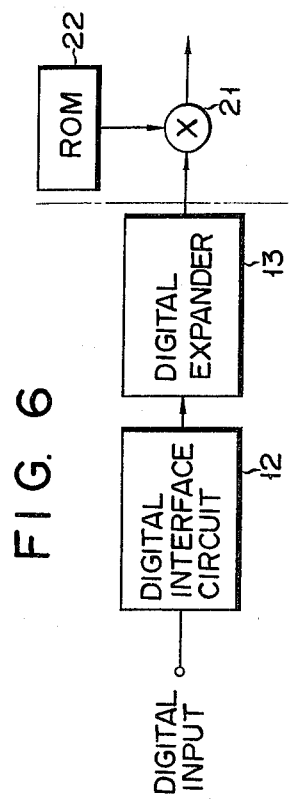
F I G. 5
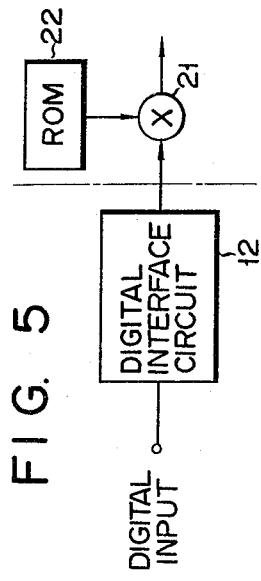
F I G. 6
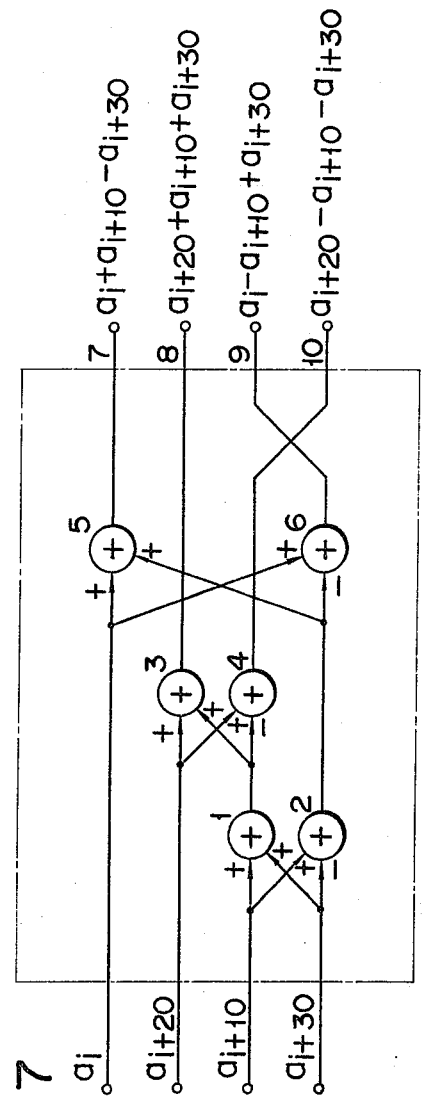
F I G. 7

DIGITAL MULTIFREQUENCY SIGNALLING RECEIVER

BACKGROUND OF THE INVENTION

This invention relates to a digital multifrequency signaling receiving system using discrete Fourier transform and more specifically to a digital multifrequency signaling receiving system with reduced number of operations.

Presently, multifrequency signaling (hereinafter referred to as MF signaling) is used for transmission of inter-office register signaling as standardized signaling between crossbar exchanges. For the exchanges themselves, stored-program controlled exchanges and time division multiplexed exchanges have come to be used, and for the signaling system, there is a movement to swtich over to the common channel signaling system. These stored-program controlled exchanges, however, must employ the MF signaling for the crossbar exchanges, so that it is important to improve receiving systems for such MF signaling.

In such MF signaling receiving systems, the input frequency has conventionally been detected by the digital filter (DF) method. This DF method detects the frequency of the input signal through filter banks. For technical literature, reference is made to "An All Digital Telephony Signalling Module" (IEEE Proc. circuit and system theory, 1975), by P. Kaul and H. Lieberman.

According to the DF method, however, filters for an analogue receiver are directly replaced by the digital filters, so that the order of the filters becomes large and the size of hardware used or number of operations will be increased.

As another conventional method, there is the discrete Fourier transform (DFT) method. In this method, the input signal is Fourier-transformed, and the input frequency is detected by obtaining the coefficients of the Fourier series of the input signal. For technical literature concerning this method, reference is made to "Digital MF Receiver using Discrete Fourier Transform" (IEEE Trans. on Communications vol. COM-21, No. 12).

However, as may be seen from the above literature, software in a universal computer cannot process the input signal in real time in the DFT MF reception system, so that the receiver need be composed of dedicated hardware. Although such receiver may effectively be used as a receiver for large-office service, it is defective in economical efficiency, extension cost, etc. for small-office use.

SUMMARY OF THE INVENTION

The object of this invention is to provide a digital multifrequency signaling receiving system eliminating the above defects, reducing the number of operations in the operation processes for MF signals, and providing high economical efficiency and extensibility even for small-office use.

In order to attain the above object, the digital multifrequency signaling receiving system of this invention comprises a first operation means for executing an operation to multiply multifrequency (MF) signals as input signals composed of N samples by a window function to obtain products, the window function including coefficients required for fast Fourier transformation of the products; a second operation means for fast Fourier transforming of the products as sample signals, the second operation means including a delay means for delaying the products to halve the number of the products and a subtractor for delivering difference signals or N/2 sample signals representing the difference between the delayed products and the current products, and a logic circuit for executing a logical operation on the difference signals or N/2 sample signals, taking advantage of the fact that some outputs of a Fourier transform are represented as the conjugate complex of the other outputs of Fourier transformation in the process of Fourier transform for the N/2 sample signals delivered from the subtractor; a third operation means for executing discrete Fourier transform for the MF signal samples delivered from the logic circuit; and a fourth operation means for providing an output to detect the input frequencies of the discrete-Fourier-transformed MF signals.

With the above-mentioned construction, the digital multifrequency signaling receiving system of this invention performs fast Fourier transformation of the sample signals immediately before discrete Fourier transformation at the second operation means. The number of multiplications in the detection of the input MF signals can be reduced be using fast Fourier transform and by taking advantage of the fact that some outputs of the fast Fourier transform may be represented by the conjugate complex of the other outputs in the fast Fourier transform process. Accordingly, there may be provided an economical digital multifrequency signaling receiving system using a general microprocessor in which a calculation program in accordance with a flow chart is performed, and which is efficient for a small-office use receiving system.

BRIEF DESCRIPTION OF THE DRAWINGS

FIG. 5 is a circuit diagram showing an example of an input part as shown in FIG. 4;

FIG. 6 is a circuit diagram showing another example of the input part as shown in FIG. 4;

FIG. 7 is a specific circuit diagram of a logic circuit in an FFT operation part as shown in FIG. 4;

DETAILED DESCRIPTION OF THE PREFERRED EMBODIMENTS

Figure 1:
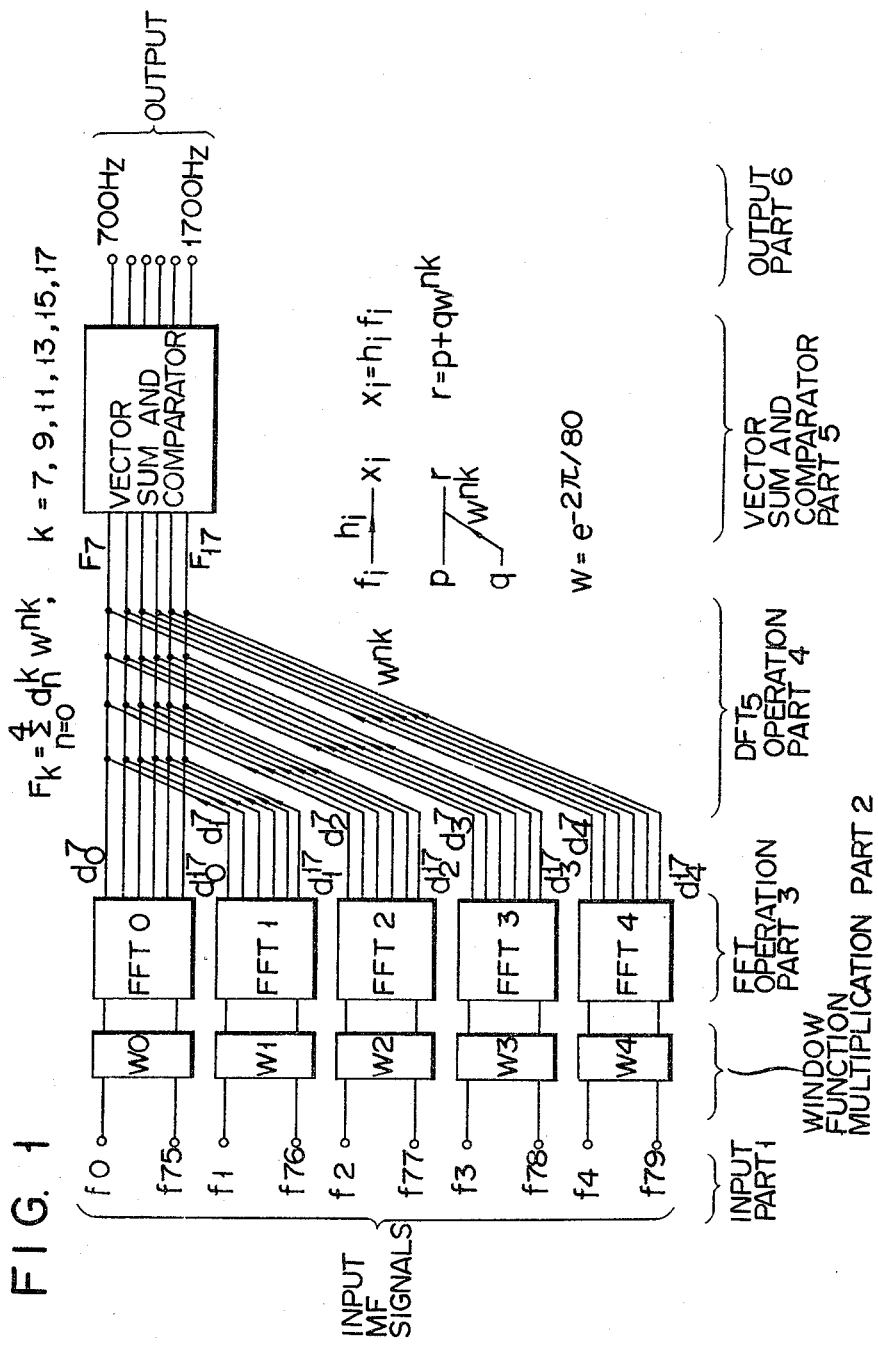
FIG. 1 is a block diagram for illustrating the operation processes for MF signals according to this invention.

In general, MF signaling is formed by combining two out of six frequencies—700 Hz, 900 Hz, 1,100 Hz, 1,300 Hz, 1,500 Hz and 1,700 Hz. The common period of the six frequencies is 10 msec. MF signaling sampled with a sampling period of 125 μsec, 80 samples of the MF signal are obtained. That is, the frequency of the MF signaling may be detected by making an analysis for each 80 samples. The discrete Fourier transform $F_k$ of an MF signaling $f_n = f(nT)$ $(n=0, 1, \ldots N-1)$ at $K \times 100$ Hz ($k = 7, 9, 11, 13, 15, 17$) is calculated as follows:

$$F_k = \sum_{n=0}^{N-1} f_n h_n W^{kn} \cdot (k = 7, 9, 11, 13, 15, 17) \quad (1)$$

where T is sampling period (125 μsec), N is number of samples (80), $\Omega$ is detection frequency space of discrete Fourier transform ($\Omega = 2\pi/NT = 2\pi \times 100$), and $j = \sqrt{-1}$.

The existence of signals for each of the MF signaling frequencies may be detected by comparing the square of the absolute value of $F_k$, that is, $$P(k\Omega) = |F(k\Omega)|^2 (k=7, 9, 11, 13, 15, 17) \quad (2)$$

with a fixed threshold value. Here $h_n$ is a window function for improving the frequency selectivity of $P(k\Omega)$, such as humming window given by $$h_n = h(nT) = 0.54 + 0.46 \cos \frac{(nT - \frac{NT}{2})}{\frac{NT}{2}} \quad (3)$$

In equation (1), $$W = e^{-j2\pi \frac{1}{N}} = \cos(2\pi \frac{1}{N}) - j \sin(2\pi \frac{1}{N}),$$

W is a unit vector obtained by dividing into 80 equal parts a unit circle of a Gaussian plane with real and imaginary numbers respectively on the axes of the abscissa and ordinate, shifted $-2\pi/80$ radian from the real axis. For example, $W^0 = 1$, $W^{40} = -1$, $W^{20} = -j$, $W^{60} = j$, $$W^{10} = \frac{1}{\sqrt{2}} (1 - j) \text{ and } W^5 =$$

$$-A - Bj(A = \cos \frac{\pi}{8}, B = \sin \frac{\pi}{8}).$$

80-point DFT system or $DFT_{80}$ directly calculates equation (1). Suffix n of $DFT_n$ represents the number of points of the discrete Fourier transform. The $DFT_{80}$ system requires 80 multiplications of the window function, $8 \times 6$ multiplications of a sine wave of W and $80 \times 6$ multiplications of a cosine wave of W. Thus, 1,040 ($=80 + 80 \times 6 \times 2$) multiplications must be carried out in 10 msec in a DFT 80 system. Here the operation of a vector sum and comparator is not included, because this part can be realized only by ROMs as will be described later.

FIG. 1 indicates that the operation processes for the MF signals of this invention are executed by an input part or means 1, a window function multiplication part or means 2, an FFT operation part or means 3, a $DFT_5$ operation part or means 4 for 5-point discrete Fourier transform, a vector sum and comparator part or means 5, and an output part or means 6. The window function multiplication part 2 consists of 5 portions $W_0$ to $W_4$, and the FFT operation part 4 consists of 5 portions $FFT_0$ to $FFT_4$. The $DFT_5$ operation part 4 consists of 6 $DFT_5$'s corresponding to 6 frequencies of the MF signaling.

The input part 1 classifies the MF signals into 80 samples $f_0$ to $f_{79}$, applying $f_n$ to $W_0$ where $$n = 5l + 20j (l=0, 1, 2, 3; j=0, 1, 2, 3), \quad (4)$$

to $W_1$ where $$n = 5l + 2j + 1 (l=0, 1, 2, 3; j=0, 1, 2, 3), \quad (5)$$

to $W_2$ where $$n = 5l + 20j + 2 (l=0, 1, 2, 3; j=0, 1, 2, 3), \quad (6)$$

to $W_3$ where $$n = 5l + 20j + 3 (l=0, 1, 2, 3; j=0, 1, 2, 3), \quad (7)$$

and to $W_4$ where $$n = 5l + 20j + 4 (l=0, 1, 2, 3; j=0, 1, 2, 3). \quad (8)$$

In the window function multiplication part 2, the 80 samples of input MF signals $f_0$ to $f_{79}$ are multiplied by $g_n$ obtained by multiplying the window function $h_n$ by $A = \cos \pi/8$ and or $1/\sqrt{2}$ as constants required for fast Fourier transform as will be mentioned later. Thus, $g_n$ can be given by $$g_n = \begin{cases} h_n & (n = i + 20j) \\ Ah_n & (n = 5 + i + 20j) \\ \frac{A}{\sqrt{2}} h_n & (n = 10 + i + 20j) \\ \frac{A}{\sqrt{2}} h_n & (n = 15 + i + 20j) \end{cases} \quad (9)$$

where $i = 0, 1, 2, 3, 4$ and $j = 0, 1, 2, 3$. If $n = 11$, for example, $i = 1$ and $j = 0$, and so $f_{11}$ is multiplied by $g_{11} = (1/\sqrt{2})h_{11}$.

Figure 2:
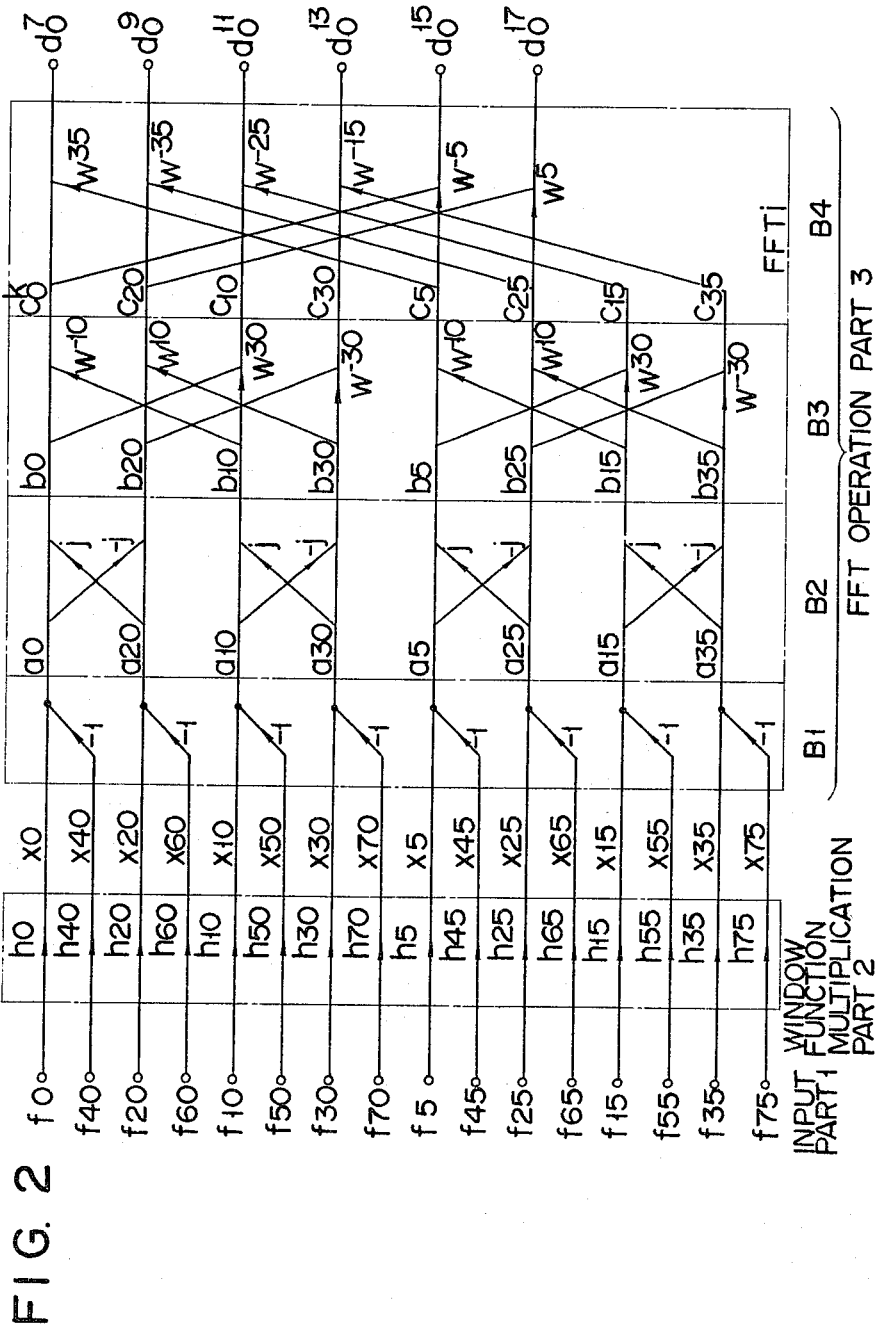
FIG. 2 is a chart showing the operation sequences of fast Fourier transform (FFT) parts shown in FIG. 1.
Figure 3:
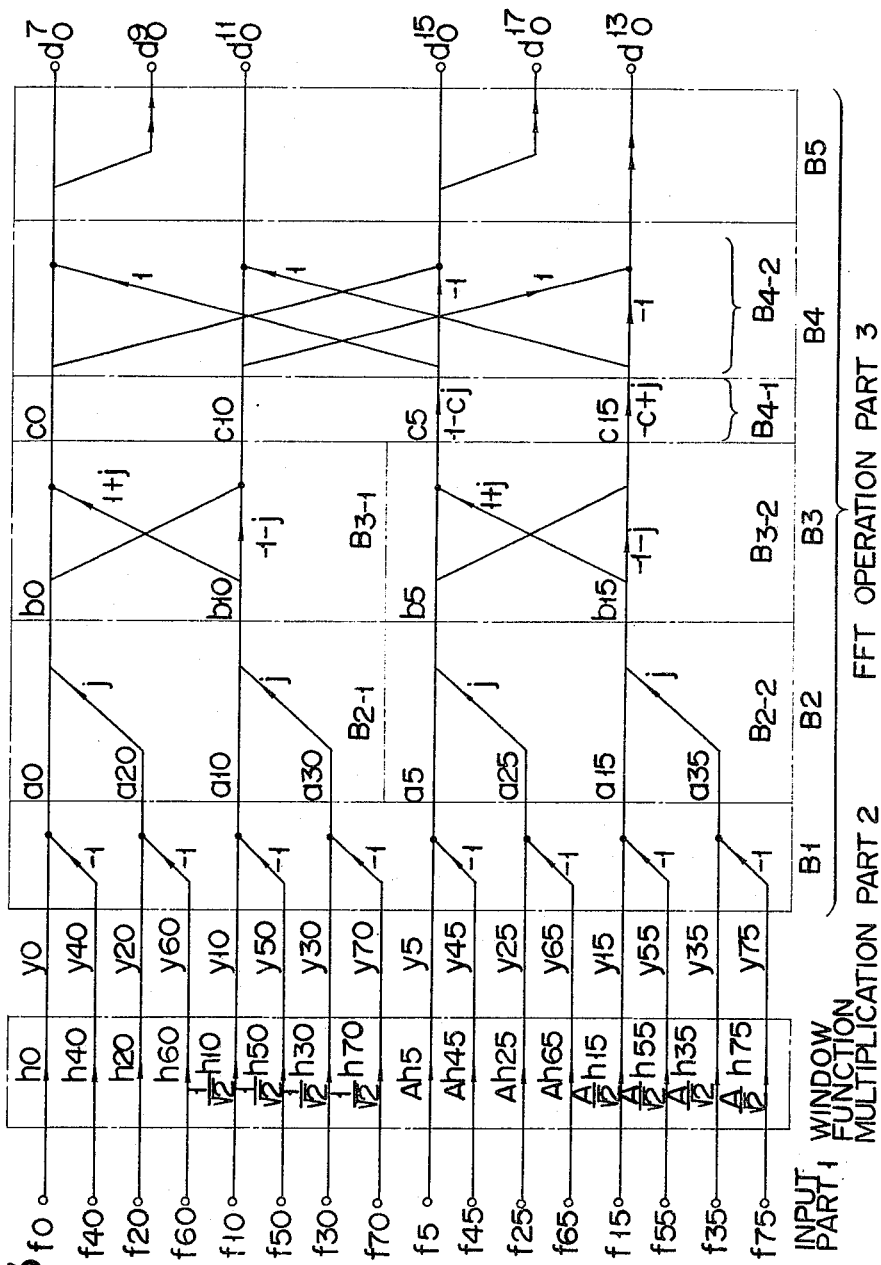
FIG. 3 is a chart indicating that the operation sequences of FIG. 2 can be simplified.

FIG. 3 shows the FFT operation part 3 in detail. In order to give a detailed explanation of the drawing of FIG. 3, it is necessary first to describe the operation sequences, with reference to FIG. 2. FIG. 2 illustrates a $W_0$-$FFT_0$ part of FIG. 1 in detail, in which the FFT operation part 3 is formed of B1, B2, B3 and B4. In FIG. 2, "An algorithm for the Machine Calculation of Complex Fourier Series" (Mathematics of Computation, Vol. 19, No. 90, 1965) by Cooley, J. W. and Tukey, L. W. is applied to the 80 samples of the MF signaling.

The input and output samples of the FFT operation part 3 in FIG. 2 are selected from those for $W_0$ and $FFT_0$, for example; the description here may cover also other $W_i$ and $FFT_i (i=1, 2, 3, 4)$. In FIG. 2, an input MF signal $f_n$ ($n=0, 1, \ldots 79$) is multiplied by $h_n$ ($n=0, 1, \ldots 79$) at the window function multiplication part 2. That is $$x_n = h_n f_n \tag{10}$$

Then, $x_n$ ($n=0, 1, \ldots 79$) is applied to the input of the FFT operation part 3.

In the FFT operation part 3, the output $F_k$ of $DFT_{80}$ is obtained as follows:

$$F_k = \sum_{n=0}^{79} x_n W^{nk} \quad (k = 7, 9, \ldots 17) \tag{11}$$

In equation (11), the sum covering $n=0$ to 79 may be divided into two portions; $n=0$ to 39 and $n=40$ to 79. Thus, $F_k$ can be obtained as follows:

$$F_k = \sum_{n=0}^{39} x_n W^{nk} + \sum_{n=40}^{79} x_n W^{nk} \tag{12}$$

Here the second term may be changed into $$\sum_{n=0}^{39} x_{n+40} W^{(n+40)k}$$

by replacing n with n+40. Then we obtain $$F_k = \sum_{n=0}^{39} (x_n W^{nk} + x_{n+40} W^{(n+40)k}) \tag{13}$$
$$= \sum_{n=0}^{39} (x_n + x_{n+40} W^{40k}) W^{nk}.$$

That is, it will be required only that $a_n = x_n + x_{n+40} W^{40k}$ be calculated for the input signal $x_n$, and that 40-point DFT ($DFT_{40}$) be calculated for $a_n$, assuming, $$F_k = \sum_{n=0}^{39} a_n W^{nk}. \tag{14}$$

Considering that $W^{40}$ is $-1$ as mentioned before and k is an odd number in an MF receiver, $a_n$ is $$a_n = x_n - x_{n+40} \tag{15}$$

These operations are performed at B1 of FIG. 2.

Thus, $F_k$ may be calculated according to equation (14) from $a_n$ which can be obtained from $x_n$. Hereupon, equation (14) may be divided into two portions; $n=0$ to 19 and $n=20$ to 39. That is, we obtain $$F_k = \sum_{n=0}^{19} (a_n + a_{n+20} W^{20k}) W^{nk}. \tag{16}$$

Then, after $b_n = a_n + a_{n+20} W^{20k}$ is calculated, $F_k$ can obtained from 20-point DFT ($DFT_{20}$) given by $$F_k = \sum_{n=0}^{19} b_n W^{nk}. \tag{17}$$

Since $W^{20}$ is $-j$ as mentioned before, $W^{20k} = j$ for $k=7$, 11, 15 and $W^{20k}$ is $31j$ for $k=9$, 13, 17. Namely, $b_n = a_n + j a_{n+20}$ is calculated for 700 Hz, 1,100 Hz and 1,500 Hz, and $b_n = a_n - j a_{n+20}$ is calculated for 900 Hz, 1,300 Hz and 1,700 Hz. These operations are performed at B2 of FIG. 2.

Thus, $F_k$ may be calculated according to equation (17), obtaining $a_n$ from $x_n$ and $b_n$ from $a_n$. Equation (17) may be divided into two portions: $n=0$ to 9 and $n=10$ to 19. That is, we obtain $$F_k = \sum_{n=0}^{9} (b_n + b_{n+10} W^{10k}) W^{nk}. \tag{18}$$

Then, after $c_n = b_n + b_{n+10} W^{10k}$ is calculated, $F_k$ can be obtained from 10-point DFT ($DFT_{10}$) given by $$F_k = \sum_{n=0}^{9} c_n W^{nk} \tag{19}$$

Since $W^{10}$ is $(1/\sqrt{2})(1-j)$ as mentioned before, we obtain $$\left. \begin{array}{l} W^{10k} = \dfrac{1}{\sqrt{2}} (1 + j) \text{ for } k = 7, 15, \\[4pt] W^{10k} = \dfrac{1}{\sqrt{2}} (1 - j) \text{ for } k = 9, 17, \\[4pt] W^{10k} = \dfrac{1}{\sqrt{2}} (-1 - j) \text{ for } k = 11, \text{ and} \\[4pt] W^{10k} = \dfrac{1}{\sqrt{2}} (-1 + j) \text{ for } k = 13. \end{array} \right\} \tag{20}$$

That is, $$\left. \begin{array}{l} c_n = b_n + \dfrac{1}{\sqrt{2}} (1 + j) b_{n+10} \text{ for 700Hz and 1,500Hz,} \\[4pt] c_n = b_n + \dfrac{1}{\sqrt{2}} (1 - j) b_{n+10} \text{ for 900Hz and 1,700Hz,} \\[4pt] c_n = b_n + \dfrac{1}{\sqrt{2}} (-1 - j) b_{n+10} \text{ for 1,100Hz, and} \\[4pt] c_n = b_n + \dfrac{1}{\sqrt{2}} (-1 + j) b_{n+10} \text{ for 1,300Hz} \end{array} \right\} \tag{21}$$

are calculated. These operations are performed at B3 of FIG. 2.

Thus, $F_k$ may be calculated according to equation (19), obtaining $a_n$ from $x_n$, $b_n$ from $a_n$, and $c_n$ from $b_n$. Equation (19) may be divided into two portions; $n=0$ to 4 and $n=5$ to 9. That is, we obtain $$F_k = \sum_{n=0}^{4} (c_n + c_{n+5} W^{5k}) W^{nk}. \tag{22}$$

Then, after $d_n = c_n + c_{n+5} W^{5k}$ is calculated, $F_k$ can be obtained from 5-point DFT ($DFT_5$) given by $$F_k = \sum_{n=0}^{4} d_n W^{nk}. \tag{23}$$

Since $$W^5 = -A - Bj \;(A = \cos\frac{\pi}{8}, B = \sin\frac{\pi}{8})$$

as mentioned before, $d_n$ is $$\left.\begin{array}{l}d_n = c_n + (A + Bj)c_{n+5} \text{ with } k = 7 \text{ (700Hz)}\\ d_n = c_n + (-A - Bj)c_{n+5} \text{ with } k = 9 \text{ (900Hz)},\\ d_n = c_n + (-B + Aj)c_{n+5} \text{ with } k = 11 \text{ (1,100Hz)},\\ d_n = c_n + (B + Aj)c_{n+5} \text{ with } k = 13 \text{ (1,300Hz)},\\ d_n = c_n + (A + Bj)c_{n+5} \text{ with } k = 15 \text{ (1,500Hz)},\\ d_n = c_n + (A - Bj)c_{n+5} \text{ with } k = 17 \text{ (1,700Hz)}.\end{array}\right\} \quad (24)$$

Accordingly, $d_n$ can be calculated from $c_n$ according to equation (23).

These operations are performed at B4 of FIG. 2.

Thus, the input signal $f_n$ is multiplied by the window function $h_n$ to provide $x_n$, from which $a_n$ is obtained. Then, $b_n$, $c_n$ and $d_n$ are obtained from $a_n$, $b_n$ and $c_n$ respectively, and finally $F_k$ can be obtained from $d_n$ according to equation (23). Further, the frequency of the input signal may be detected by obtaining $P(k\Omega)$ ($k=7, 9, 11, 13, 15, 17$) from $F_k$ according to equation (2) and comparing it with the fixed threshold value. These processes are shown in the flow charts of FIGS. 1 and 2.

The input part makes rearrangements in accordance with equations (4) to (8), and then the window function multiplication part calculates $x_n = h_n f_n$. Moreover, sections B1, B2, B3 and B4 perform operations of $a_n = x_n - x_{n+40}$, $b_n = a_n + a_{n+20}W^{20k}$, $c_n = b_n + b_{n+10}W^{10k}$, and $d_n + c_n + c_{n+5} W^{5k}$ respectively, the DFT4 operation part operates $$F_k = \sum_{n=0}^{4} d_n{}^k W^{nk} \; (k = 7, 9, \ldots 17),$$

and the vector sum and comparator part operates $P(k\Omega) = |F_k|^2$ ($k=7, 9, \ldots 17$).

Now there will be described features and advantages of this invention.

FIG. 2, in which the FFT is applied to an MF receiver, can be simplified as shown in FIG. 3, and the number of operations can be reduced. The first facility for such simplification is the relations $$\left.\begin{array}{l}\overline{d_n{}^9} = d_n{}^7,\\ \overline{d_n{}^{17}} = d_n{}^{15}, \text{ and}\\ \overline{d_n{}^{13}} = c_n{}^{11} - c_{n+5}^{11}(-B + Aj)\end{array}\right\} \quad (25)$$

in FIG. 2. Here $c_n{}^k$ is $c_n$ for k. The second facility is that the number of multiplications at the FFT operation part can be reduced by previously multiplying the window function $h_n$ by the coefficient $1/\sqrt{2}$ of equation (20) and coefficient A of equation (24). Namely, the input MF signal is multiplied by $g_n$ given by equation (9) as follows:

$$y_n = f_n g_n \quad (26)$$

These two points are the features of this invention.

Meanwhile, it can be understood that equation (25) holds as follows. That is, in the equation $\overline{d_n{}^9} = d_n{}^7$, the real part of $d_n{}^9$ equals the real part of $d_n{}^7$, and the imaginary part of $d_n{}^9$ equals the imaginary part of $d_n{}^7$, provided its sign is inverted; $d_n{}^9$ and $d_n{}^7$ are conjugate complex numbers.

With respect to $\overline{d_n{}^9} = d_n{}^7$, for example, $\overline{d_n{}^9}$ is $$\overline{d_n{}^9} = \overline{c_n{}^9} + (-A + Bj)\overline{c_{n+5}^9} \quad (27)$$

according to equation (24). From equation (20), $\overline{c_n{}^9}$ is $$\overline{c_n{}^9} = \overline{b_n{}^9} + \frac{1}{\sqrt{2}}(1 + j)\overline{b_{n+10}^9} \quad (28)$$

In equation (28), $\overline{b_n{}^9}$ becomes $$\overline{b_n{}^9} = \overline{a_n{}^9} + \overline{a_{n+20}^9 j} \quad (29)$$

Further, $\overline{a_n{}^9}$ is $$\overline{a_n{}^9} = x_n - x_{n+40} \quad (30)$$

Here $x_n - x_{n+40} = a_n{}^7$, so that equation (29), (28) and (27) can be respectively rewritten as follows:

$$\overline{b_n{}^9} = a_n{}^7 + a_{n+20}^7 j = b_n{}^7$$

$$\overline{c_n{}^9} = b_n{}^7 + \frac{1}{\sqrt{2}}(1 + j)b_{n+10}^7 = c_n{}^7,$$

$$\overline{d_n{}^9} = c_n{}^7 + (-A + Bj)c_{n+5}^7 = d_n{}^7.$$

Accordingly, $\overline{d_n{}^9} = d_n{}^7$ holds.

Likewise, $\overline{d_n{}^{17}} = d_n{}^{15}$ of equation (25) holds because we can obtain $$\left.\begin{array}{l}\overline{a_n{}^{17}} = a_n{}^{15},\\ \overline{b_n{}^{17}} = b_n{}^{15}, \text{ and}\\ \overline{c_n{}^{17}} = c_n{}^{15}.\end{array}\right\} \quad (31)$$

Moreover, $\overline{d_n{}^{13}} = c_n{}^{13} + (B = Aj)c_{n+5}^{13}$ of equation (24) also holds because we can obtain $$\left.\begin{array}{l}\overline{a_n{}^{13}} = a_n{}^{11},\\ \overline{b_n{}^{13}} = b_n{}^{11}, \text{ and}\\ \overline{c_n{}^{13}} = c_n{}^{11}.\end{array}\right\} \quad (32)$$

From this first point of view, the outputs of $d_n{}^9$, $d_n{}^{13}$ and $d_n{}^{17}$ need not be calculated, but may be obtained from the outputs of $d_n{}^7$, $d_n{}^{11}$ and $d_n{}^{15}$ respectively.

Further, from a second point of view, the operations for the sections B3 and B4 may be simplified by incorporating the multiplications for the sections B3 and B4 into the window function. $g_n(n=0, 1, \ldots 79)$ is the product of the window function and the constants for the sections B3 and B4, and $y_n$ is the products of the input $f_n$ and $g_n$.

As may be seen from the above description, the operation processes of FIG. 2 can be simplified as shown in FIG. 3. A section B5 of the FFT operation part is a section for obtaining $d_n^9$, $d_n^{13}$ and $d_n^{17}$ respectively from $d_n^7$, $d_n^{11}$ and $d_n^{15}$, omitting the operations for $d_n^9$, $d_n^{13}$ and $d_n^{17}$ at the sections B2, B3 and B4.

According to the operation of FIG. 3, for the reception of MF signaling, $16 \times 5$ multiplications of the window function and the constant $g_n$, $4 \times 5$ multiplications of c at a section $B_{4-1}$ and $4 \times 4 \times 6$ the multiplications at the $DFT_5$ operation part are required. Thus, the number of multiplications is $16 \times 5 + 4 \times 5 + 4 \times 4 \times 6 = 196$ in 10 msec.

Figure 4:
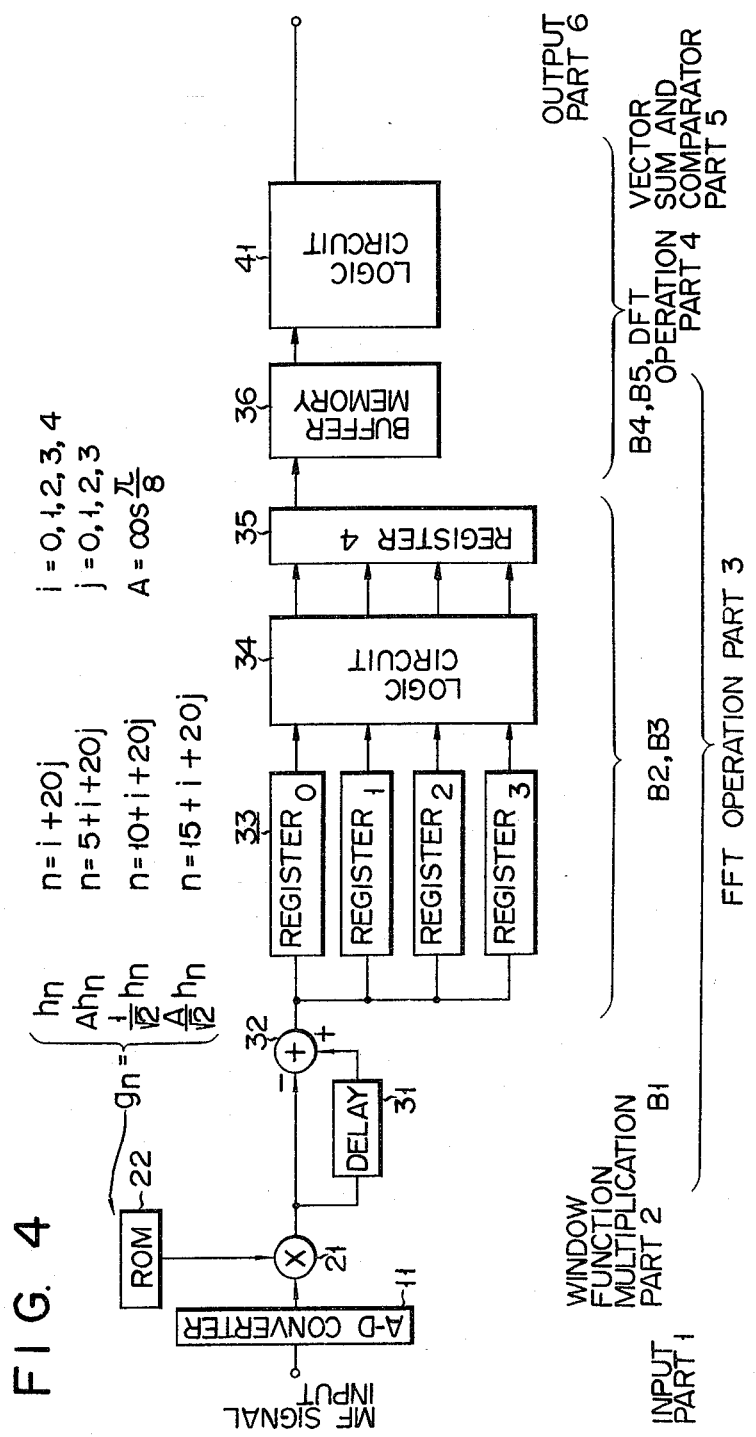
FIG. 4 is a block diagram showing the specific arrangements of sections for executing the operations in the operation processes as shown in FIG. 3.

FIG. 4 shows the specific hardware arrangements of sections for actually executing the operations in the operation processes as shown in FIG. 3. The input part 1 to which the MF signal is applied is provided with an analogue-digital converter 11 when the MF signal is an analogue signal. When the MF signal is a digital signal, there is provided a digital interface circuit 12, as shown in FIG. 5. Moreover, if the digital signal is compressed in a nonlinear code, there will be added a digital expander 13 for converting the nonlinear code into a linear code, as shown in FIG. 6. The digital expander 13 may be composed of ROMs (read-only memory), for example. The MF signal $f_n$ from the input part 1 is applied to a multiplier 21 of the window function multiplication part 2. The constant $g_n$ given by equation (9) is stored in the ROM 22, which delivers $g_n$ corresponding to $f_n$ to multiply the MF signal $f_n$ by $g_n$ at the multiplier 21.

Outputs from the window function multiplication part 2 are applied to the section B1 of the FFT operation part 3. The section B1 is composed of a delay circuit 31 for delaying the input signal 40 samples, for example, the delay circuit 31 including a shift register or RAM (random access memory), and a subtractor 32 providing the difference between the current input signal and the delayed output from the delay circuit 31.

The outputs from the subtractor 32 are applied to the sections B2 and B3. The sections B2 and B3, which are composed of a register section 33 including four parallel-connected registers 0, 1, 2, 3, a first logic circuit 34 and a register 35, perform operations for processors $B_{21}$ and $B_{-1}$ as shown in FIG. 3, as well as time-divided operations for processes $B_{2-2}$ and $B_{3-2}$ and processes $B_{2-1}$, $B_{3-1}$, $B_{2-2}$ and $B_{3-2}$ of another $FFT_i$ (i=1, 2, 3, 4).

The four registers 0, 1, 2 and 3 are supplied respectively with $a_0$, $a_1$, $a_2$, $a_3$, $a_4$, $a_5$, $a_6$, $a_7$, $a_8$ and $a_9$ (for register 0), $a_{20}$, $a_{21}$, $a_{22}$, $a_{23}$, $a_{24}$, $a_{25}$, $a_{26}$, $a_{27}$, $a_{28}$ and $a_{29}$ (for register 1), $a_{10}$, $a_{11}$, $a_{12}$, $a_{13}$, $a_{14}$, $a_{15}$, $a_{16}$, $a_{17}$, $a_{18}$ and $a_{19}$ (for register 2) and $a_{30}$, $a_{31}$, $a_{32}$, $a_{33}$, $a_{34}$, $a_{35}$, $a_{36}$, $a_{37}$, $a_{38}$ and $a_{39}$ (for register 3).

First, prescribed operations are executed for $a_0$, $a_{20}$, $a_{10}$ and $a_{30}$ at the first logic circuit 34, and the results are transferred to a register 35 and then applied to a buffer memory 36.

FIG. 7 shows a specific arrangement of the first logic circuit 34, where prescribed operations are performed for the processes $B_{2-1}$ and $B_{3-1}$ of FIG. 3. In FIG. 7, adders 1 to 6 calculate, respectively, $a_{i+10} + a_{i+30}$, $a_{i+10} - a_{i+30}$, the sum of the output of the adder 1 and $a_{i+20}$, the difference between $a_{i-20}$ and the output of the adder 1, the sum of $a_i$ and the output of the adder 2, and the difference between $a_i$ and the output of the adder 2, and there appear $$\left.\begin{array}{l} a_i + a_{i+10} - a_{i+30} = U_i, \\ a_{i+20} + a_{i+10} + a_{i+30} = X_i, \\ a_i - a_{i+10} + a_{i+30} = Y_i, \text{ and} \\ a_{i+20} - a_{i+10} - a_{i+30} = Z_i \end{array}\right\} \quad (33)$$

outputs 7 to 10 respectively. Here i varies from 0 to 9. These outputs are applied to a logic circuit 41 through the register 35 and the buffer memory 36 logic circuit.

For example, a processor is used as the logic circuit 41

In the logic circuit 41, $$\left.\begin{array}{l} CX_i - U_i = P_i, \\ -CU_i - X_i = Q_i, \\ -CY_i - Z_i = R_i, \text{ and} \\ Y_i - CZ_i = S_i \end{array}\right\} \quad (34)$$

are calculated with i=5, 6, 7, 8, 9 for the outputs $U_i$, $X_i$, $Y_i$ and $Z_i$. These outputs are the outputs of $B_{4-1}$ as shown in FIG. 3.

Then, $$\left.\begin{array}{l} U_i + P_{i+5}, X_i + Q_{i+5}, \\ Y_i + R_{i+5}, Z_i + S_{i+5}, \\ U_i - P_{i+5}, X_i - Q_{i+5}, \\ Y_i - R_{i+5}, \text{ and } Z_i - S_{i+5} \end{array}\right\} \quad (35)$$

are calculated with i=0, 1, 2, 3, 4. These outputs are the outputs of B4 of FIG. 3, which correspond to the real and imaginary parts of $d_i^7$, $d_i^{11}$, $d_i^{15}$ and $d_i^{13}$ respectively.

Subsequently, to calculate $d_i^9$, $d_i^{17}$ and $\overline{d_i^{13}}$, $$\left.\begin{array}{l} -(X_i + Q_{i+5}) = -Im(d_i^7), \\ -(X_i - Q_{i+5}) = -Im(d_i^{15}), \text{ and} \\ -(Z_i - S_{i+5}) = -Im(d_i^{17}) \end{array}\right\} \quad (36)$$

are calculated respectively for the imaginary parts of $d_i^9$, $d_i^{17}$ and $d_i^{13}$. Thus, the operations for the section B5 of FIG. 3 are completed.

Then, operations corresponding to the $DFT_5$ operation part 4 of FIG. 1 are performed. First, $d_n^k$ is multiplied by $W^{nk}$ with k=7 and n=0, 1, 2, 3, 4, and $$\sum_{n=0}^{4} d_n^k W^{nk}$$

is calculated. Likewise $$F_k = \sum_{n=0}^{4} d_n^k W^{nk}$$

for k=9, 11, 13, 15, 17 is calculated.

In the vector sum and comparator 5, the sum of the square of the real part of $F_k$ and the square of the imaginary part of $F_k$ is calculated for k=7, 9, 11, 13, 15, 17, and is compared with a predetermined fixed threshold value. The output of the logic circuit 41, logical value "1" (when the sum is larger than the fixed threshold value) or logical value "0" (when the sum is smaller than the threshold value) is delivered to a central processor of an exchange via the interface of the output part 6.

Referring now to FIGS. 8 to 12, there will be described further specific arrangements of the FFT operation part 3 and the DFT$_5$ operation part 4 as shown in FIG. 4.

Figure 8:
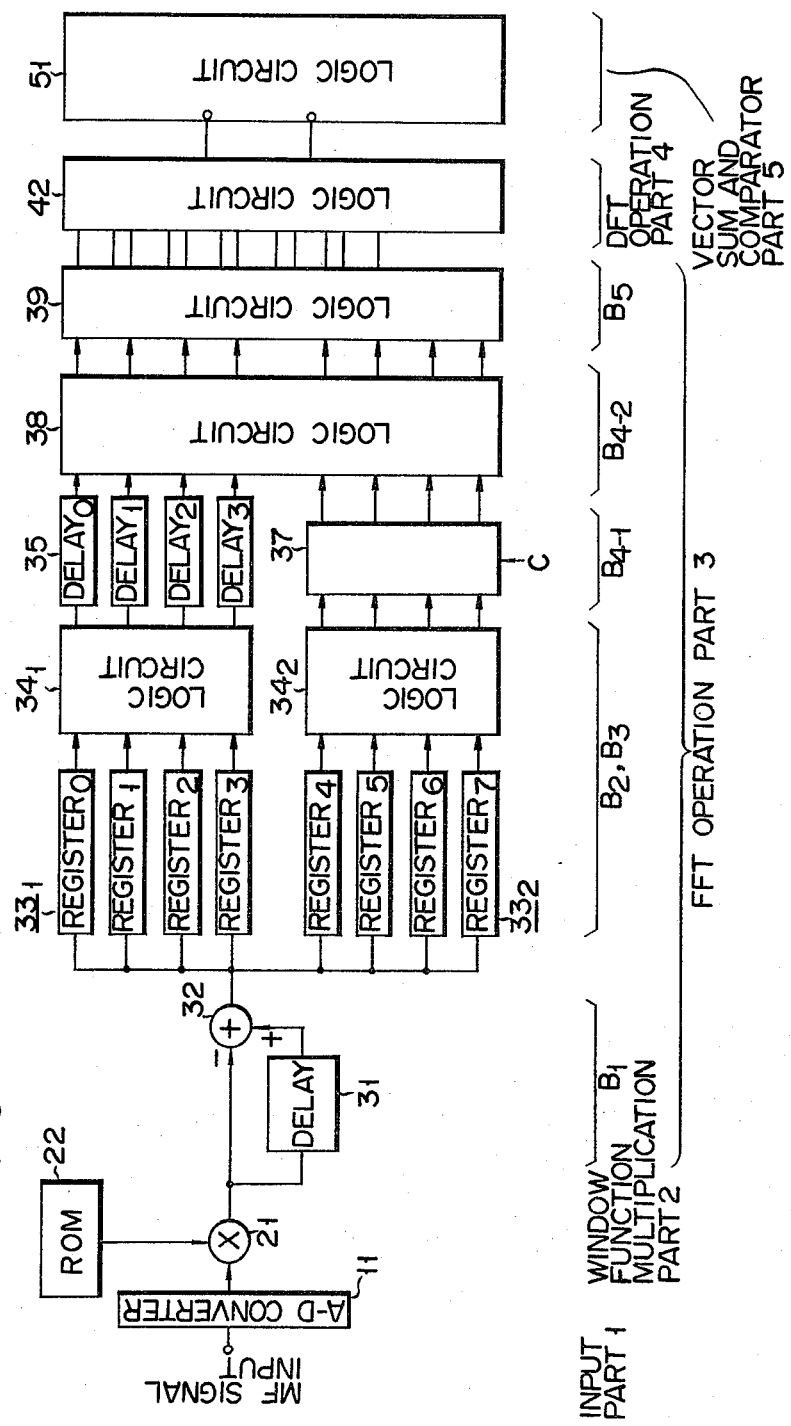
FIG. 8 is a more specific block diagram based on the block diagram of FIG. 4.

In FIG. 8, the same reference numerals are employed to designate parts as elements corresponding to those shown in FIG. 1.

The register 0 to 7 ($33_1$ and $33_2$) at the sections B2 and B3 of the FFT operation part 3 are supplied with $a_i$ as shown in FIG. 3 or given by equation (15). That is, $a_0$, $a_1$, $a_2$, $a_3$, and $a_4$ (for register 0),
$a_{20}$, $a_{21}$, $a_{22}$, $a_{23}$ and $a_{24}$ (for register 1),
$a_{10}$, $a_{11}$, $a_{12}$, $a_{13}$ and $a_{14}$ (for register 2),
$a_{30}$, $a_{31}$, $a_{32}$, $a_{33}$ and $a_{34}$ (for register 3),
$a_5$, $a_6$, $a_7$, $a_8$ and $a_9$ (for register 4),
$a_{25}$, $a_{26}$, $a_{27}$, $a_{28}$ and $a_{29}$ (for register 5),
$a_{15}$, $a_{16}$, $a_{17}$, $a_{18}$ and $a_{19}$ (for register 6), and
$a_{35}$, $a_{36}$, $a_{37}$, $a_{38}$ and $a_{39}$ (for register 7)

are applied to the registers 0 to 7 respectively.

Subsequently, ($a_i$, $a_{i+20}$, $a_{i+10}$ and $a_{i+30}$) and ($a_{i+5}$, $a_{i+25}$, $a_{i+15}$ and $a_{i+35}$) (i=0, 1, 2, 3, 4) are applied to two logic circuits $34_1$ and $34_2$ respectively. For these logic circuits $34_1$ and $34_2$, the circuit arrangement of FIG. 7 may be used.

Outputs $U_i$, $X_i$, $Y_i$ and $Z_i$ of the logic circuit $34_1$ are applied to delay circuits $35_{0, 1, 2, 3}$ respectively. These delay circuits 35, composed of shift registers or RAM's, for example, provide a delay equivalent to the delay of a logic circuit 37.

Outputs $U_{i+5}$, $X_{i+5}$, $Y_{i+5}$ and $Z_{i+5}$ of the logic circuit $34_2$ are applied to the logic circuit 37.

Figure 9:
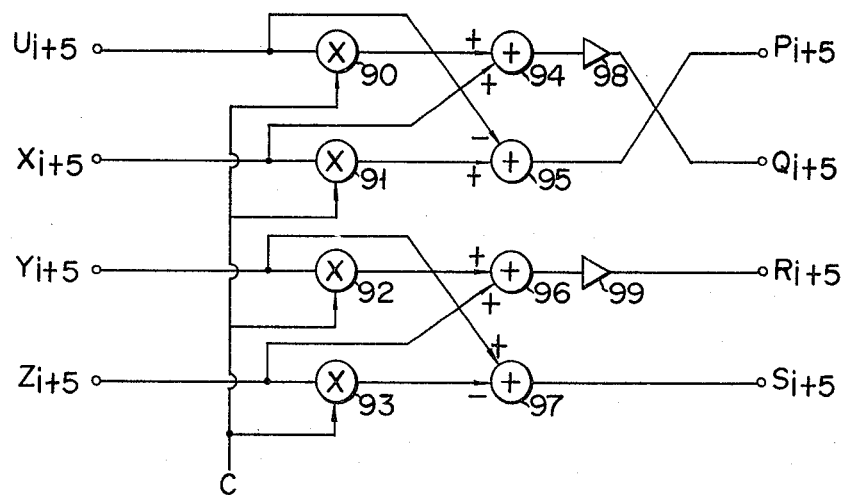
FIG. 9 is a specific connection diagram of a logic circuit constituting the FFT operation part as shown in FIG. 8.

The logic circuit 37, which is so constructed as shown in FIG. 9, performs operations corresponding to equation (34). As shown in FIG. 9, the logic circuit 37 is composed of four multipliers 90, 91, 92 and 93, adder-subtractors 94, 95, 96 and 97, and complementary circuits 98 and 99.

In the logic circuit 37, inputs $U_{i+5}$, $X_{i+5}$, $Y_{i+5}$ and $Z_{i+5}$ are severally multiplied by a constant C(=B/A=-tan($\pi/8$)), $X_{i+5}$ is added to the output of the multiplier 90 by the adder 94, and the sign of the resultant figure is inverted by the complementary circuit 98 to provide an output $Q_{i+5}$.

The output of the multiplier 91 is subtracted from $U_{i+5}$ by the subtractor 95 to provide an output $P_{i+5}$.

$Z_{i+5}$ is added to the output of the multiplier 92 by the adder 96, and an output $R_{i+5}$ is obtained by inverting the sign of the output by means of the complementary circuit 99.

The output of the multiplier 93 is subtracted from $Y_{i+5}$ by the subtractor 97 to provide an output $S_{i+5}$. Here i varies from 0 to 4. These outputs are applied to a logic circuit 38.

Figure 10:
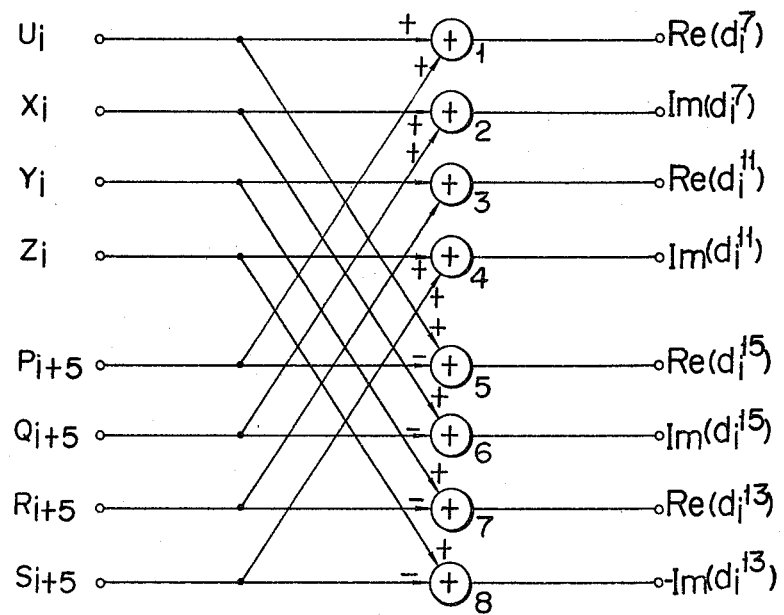
FIG. 10 is a specific connection diagram of another logic circuit as shown in FIG. 8.

The logic circuit 38, which is supplied with outputs $U_i$, $X_i$, $Y_i$ and $Z_i$ of the delay circuits $35_{0, 1, 2, 3}$, and outputs $P_{i+5}$, $Q_{i+5}$, $R_{i+5}$ and $S_{i+5}$ of the logic circuit 37, performs operations for $B_{4-2}$ of FIG. 3 corresponding to equation (34). The logic circuit 38, as shown in FIG. 10, is composed of adders 1 to 4 and subtractors 5 to 8. $U_i$ and $P_{i+5}$ are added by the adder 1 to provide an output $Re(d_i^7)$. $X_i$ and $Q_{i+5}$ are added by the adder 2 to provide an output $Im(d_i^7)$. $Y_i$ and $P_{i+5}$ are added by the adder 3 to provide an output $Re(d_i^{11})$. $Z_i$ and $S_{i+5}$ are added by the adder 4 to provide an output $Im(d_i^{11})$. $P_{i+5}$ is subtracted from $U_i$ by the subtractor 5 to provide an output $Re(d_i^{15})$. $Q_{i+5}$ is subtracted from $X_i$ by the subtractor 6 to provide an output $Im(d_i^{15})$. $R_{i+5}$ is subtracted from $Y_i$ by the subtractor 7 to provide an output $Re(d_i^{13})$. $S_{i+5}$ is subtracted from $Z_i$ by the subtractor 8 to provide an output $-Im(d_i^{13})$. Here i varies from 0 to 4. These outputs are applied to a logic circuit 39.

Figure 11:
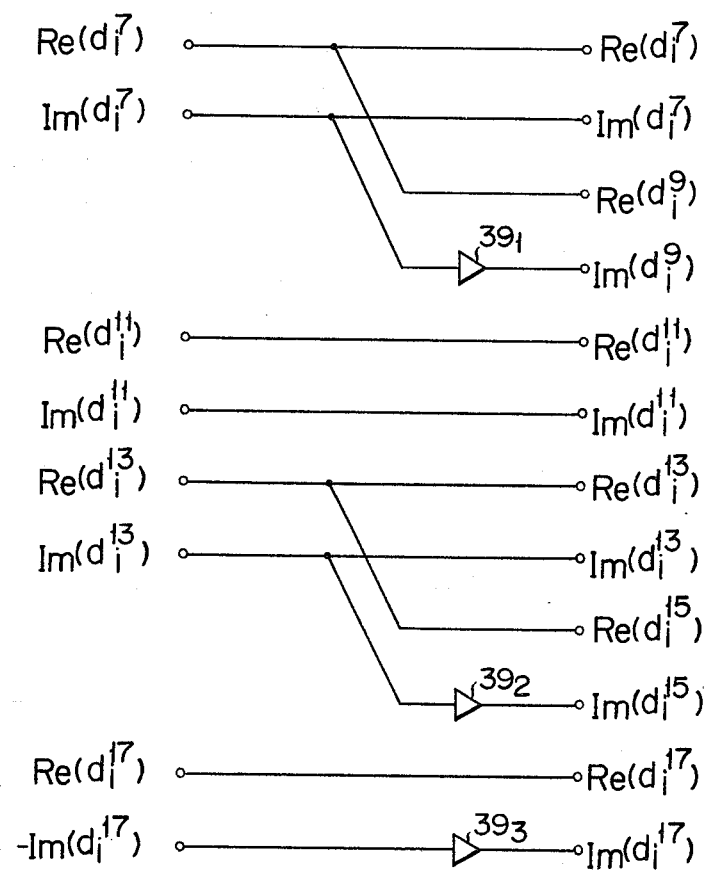
FIG. 11 is a specific connection diagram of still another logic circuit as shown in FIG. 8.

The logic circuit 39, which includes complementary circuit $39_1$, $39_2$ and $39_3$ as shown in FIG. 11, receives outputs from the logic circuit 38 and performs operations for the section B5 of the FFT operation part as shown in FIG. 3 or operations corresponding to equation (36). Outputs $Im(d_i^9)$, $Im(d_i^{15})$ and $Im(d_i^{17})$ are obtained by inverting the signs of inputs $Im(d_i^7)$, $Im(-d_i^{13})$ and $-Im(d_i^{17})$ respectively. Here i varies from 0 to 4, and these outputs are applied to a logic circuit 42 as shown in FIG. 8.

Figure 12:
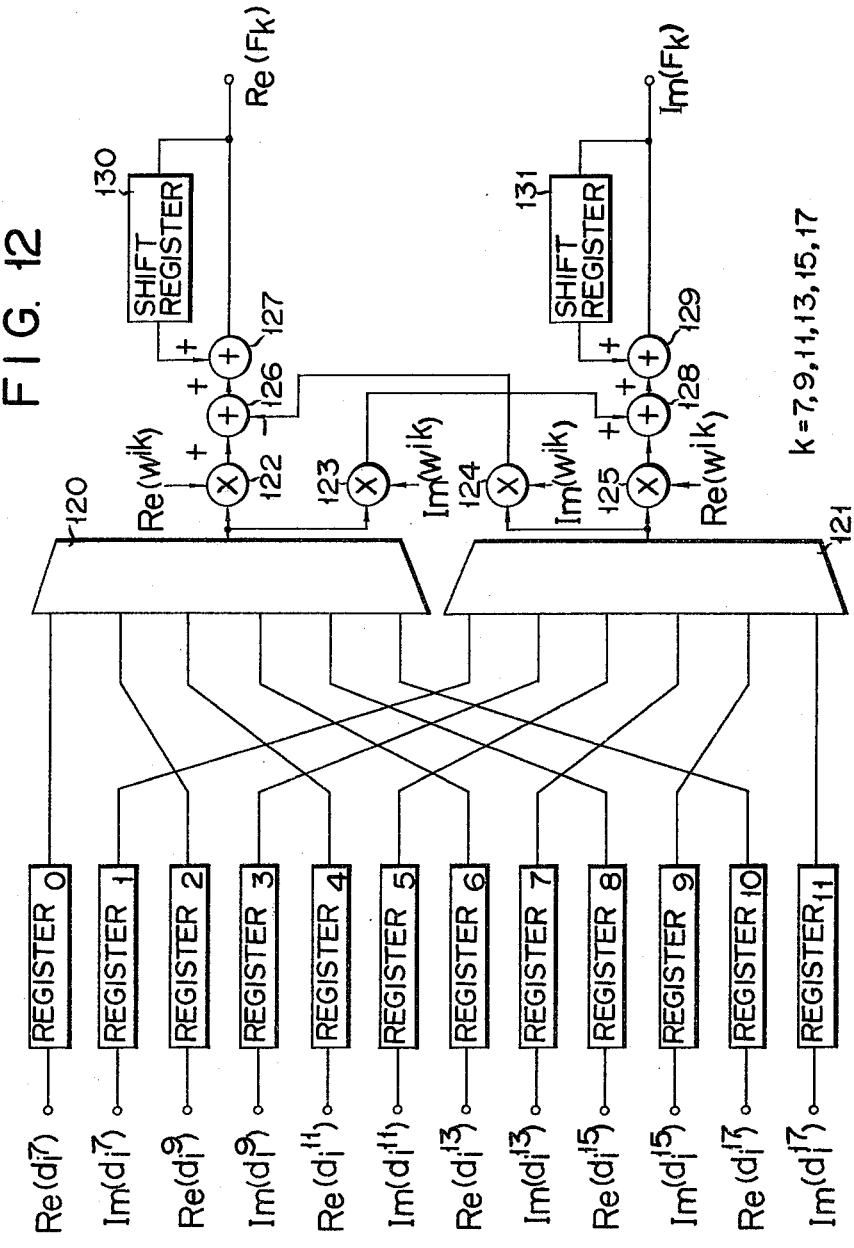
FIG. 12 is a specific connection diagram of a logic circuit constituting the discrete Fourier transform (DFT) operation part as shown in FIG. 8.

The logic circuit 42, as shown in FIG. 12, is composed of, for example, twelve registers 0 to 11, two selectors 120 and 121 for suitably selecting sample outputs from these registers 0 to 11, first and second multipliers 122 and 123 provided for the outputs from the selector 120, third and fourth multipliers 124 and 125 provided for the outputs from the selector 121, a first adder 126 connected to the first and third multipliers 122 and 124 and a second adder 127 following the first adder 126, a third adder 128 connected to the multipliers 123 and 125 and a fourth adder 129 following the third adder 128, and shift registers 130 and 131 provided correspondingly to the adders 127 and 129. The logic circuit 42 has its registers 0 to 11 supplied with outputs $Re(d_i^k)$ and $Im(d_i^k)$ (i=0, 1, 2, 3, 4; k=7, 9, 11, 13, 15, 17) from the logic circuit 39, as illustrated. For example, 5 samples for i=0, 1, 2, 3, 4 are supplied to each of the registers 0 to 11, and zeroth samples of th registers 0, 1 are selected by the selectors 120 and 121 and multiplied by $Re(W^{i7})$ at the first and fourth multipliers 122 and 125. The samples are multiplied by $Im(W^{i7})$ at the second and third multipliers 123 and 124, and the results of multiplication are subjected to addition or subtraction at the first and third adders 126 and 128, the outputs of which are added respectively to the outputs of the shift registers 130 and 131 by the second and fourth adders 127 and 129. Then, first, second, third and fourth samples are selected by the selectors 120 and 121, operated as aforesaid, and added to the zeroth, first, second and third operation results stored in the shift registers. $Re(-W^{i9})$ and $Im(W^{i9})$ are applied for the zeroth samples of the registers $2, 3$, while $Re(W^{i11})$ and $Im(W^{i11})$ are supplied for the zeroth samples of the registers 4 and 5. $Re(d_i^k)$ and $Im(d_i^k)$ applied successively to the registers are subjected to prescribed operations, and then final outputs $F_k$ (k=7, 9, 11, 13, 15, 17) are obtained as $Re(F_k)$ and $Im(F_k)$. Namely, as mentioned before, the logic circuit 42 performs operations for the DFT$_5$ operation part 4 as shown in FIG. 1 or operations corresponding to equation (23).

The outputs obtained from the logic circuit 42 are applied to a logic circuit 51 formed of the vector sum and comparator part 5 as shown in FIG. 1 or ROM.

Figure 17:
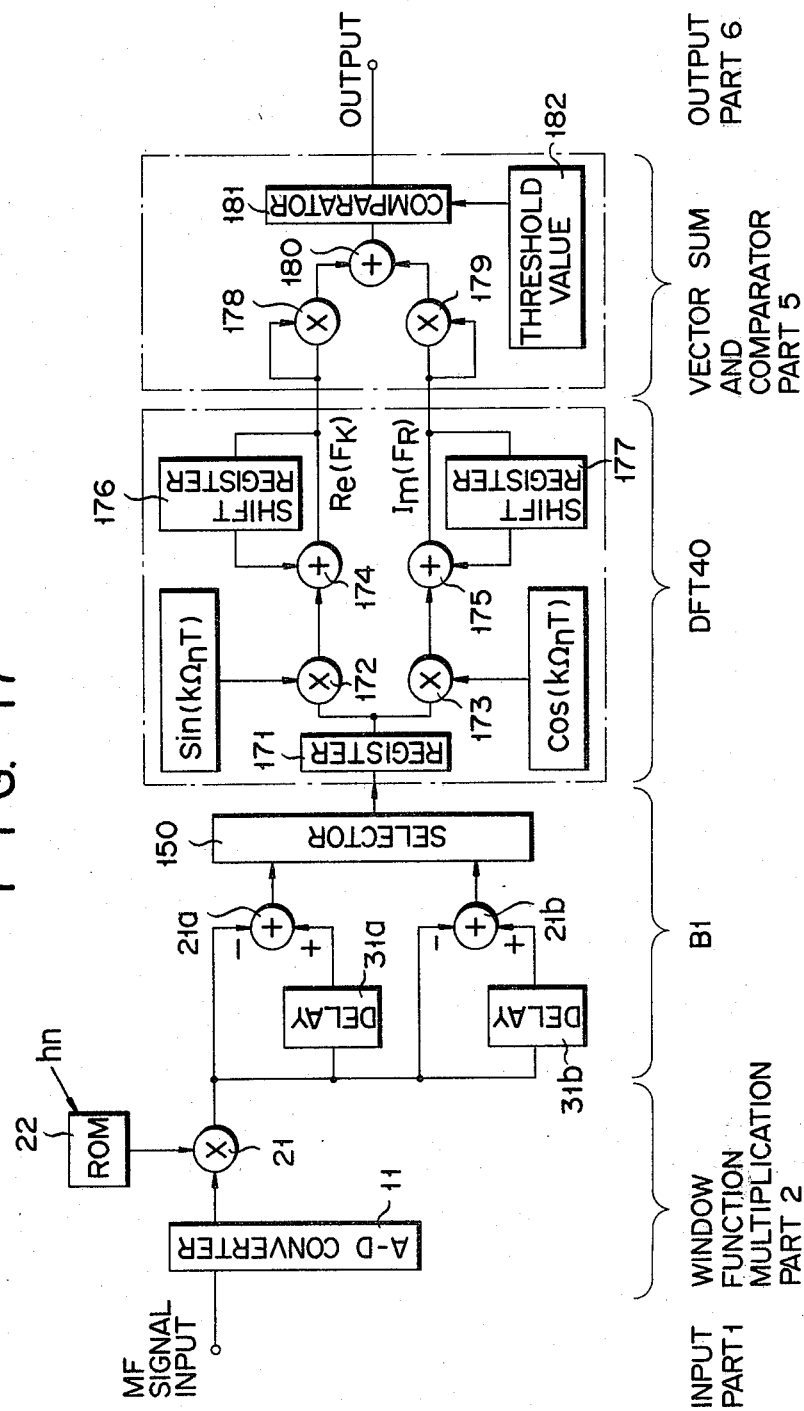
FIG. 17 is a block diagram showing circuit arrangements according to another embodiment of this invention.

The vector sum and comparator part 5, as shown in FIG. 17, is composed of multipliers 178 and 179 to which outputs $Re(F_k)$ and $Im(F_k)$ from the DFT operation part are applied respectively, an adder 180 for adding outputs from the multipliers 178 and 179 or making a calculation $(Re(F_k))^2 + (Im(F_k))^2$, and a comparator 181 for comparing an output from a threshold value generator 182 with an output from the adder 180. If a ROM is used for the vector sum and comparator part, address bits necessary for the ROM is at most the sum of the bits to express the absolute value of Re($F_k$) and the bits to express the absolute value of Im($F_k$). The contents of ROM is 1 for the addresses that (Re($F_k$))$^2$ + (Im($F_k$))$^2$ is larger than the threshold value, and 0 for the addresses that the threshold value is larger. With such ROM, a result of comparison with the threshold value may be obtained at the output of ROM by applying the absolute values of Re($F_K$) and Im($F_k$) to the address port of ROM.

Figure 13:
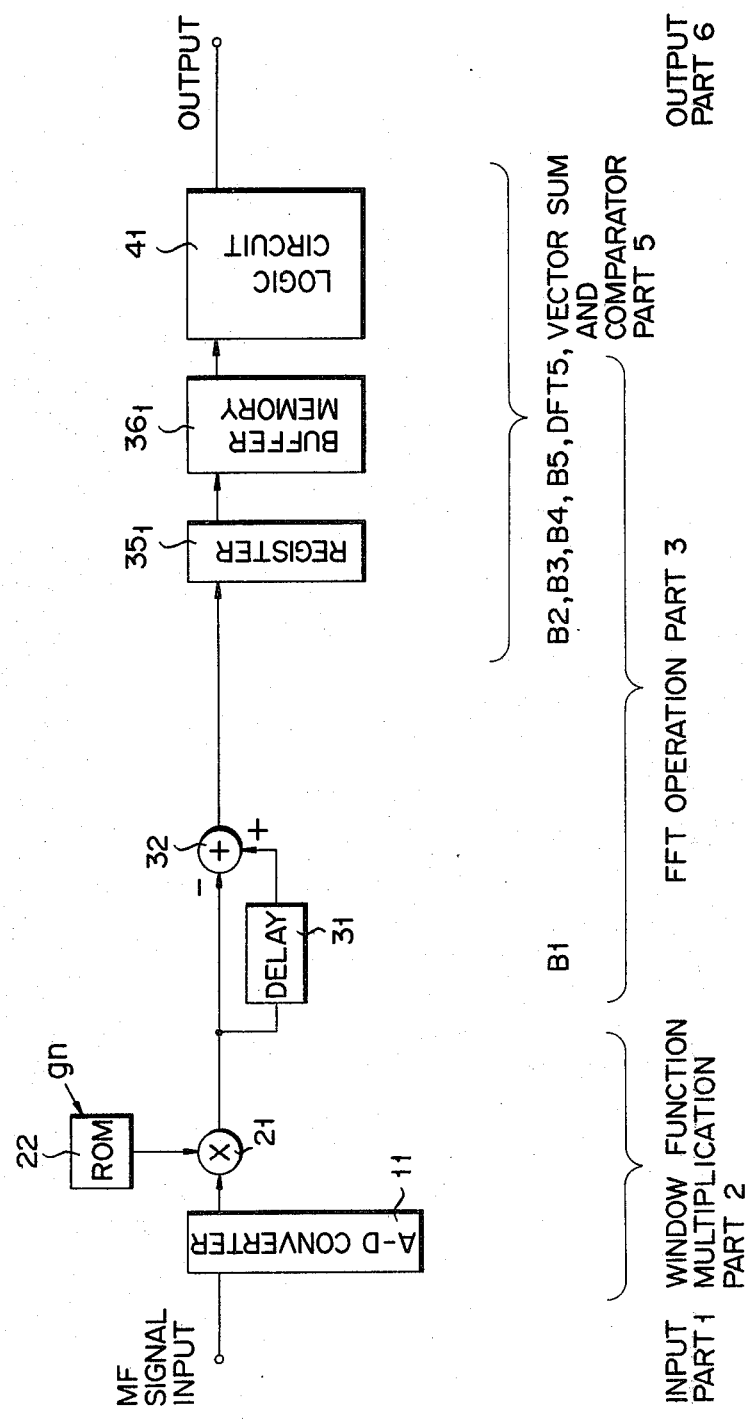
FIG. 13 is a block diagram showing an example in which part of the hardware of FIG. 4 is included in a processor.

Although this invention may be formed of the hardware as shown in FIG. 4 or 8, as described hereinbefore, the outputs from the section B1 composed of the delay circuit 31 and subtractor 32 forming part of the FFT operation part 3 may alternatively be applied directly to the register 35$_1$, as shown in FIG. 13, to perform the operations for the registers 33 and logic circuit 34 of the FFT operation part 3 as shown in FIG. 4 in the processor 41 through a buffer memory 36$_1$.

Figure 14:
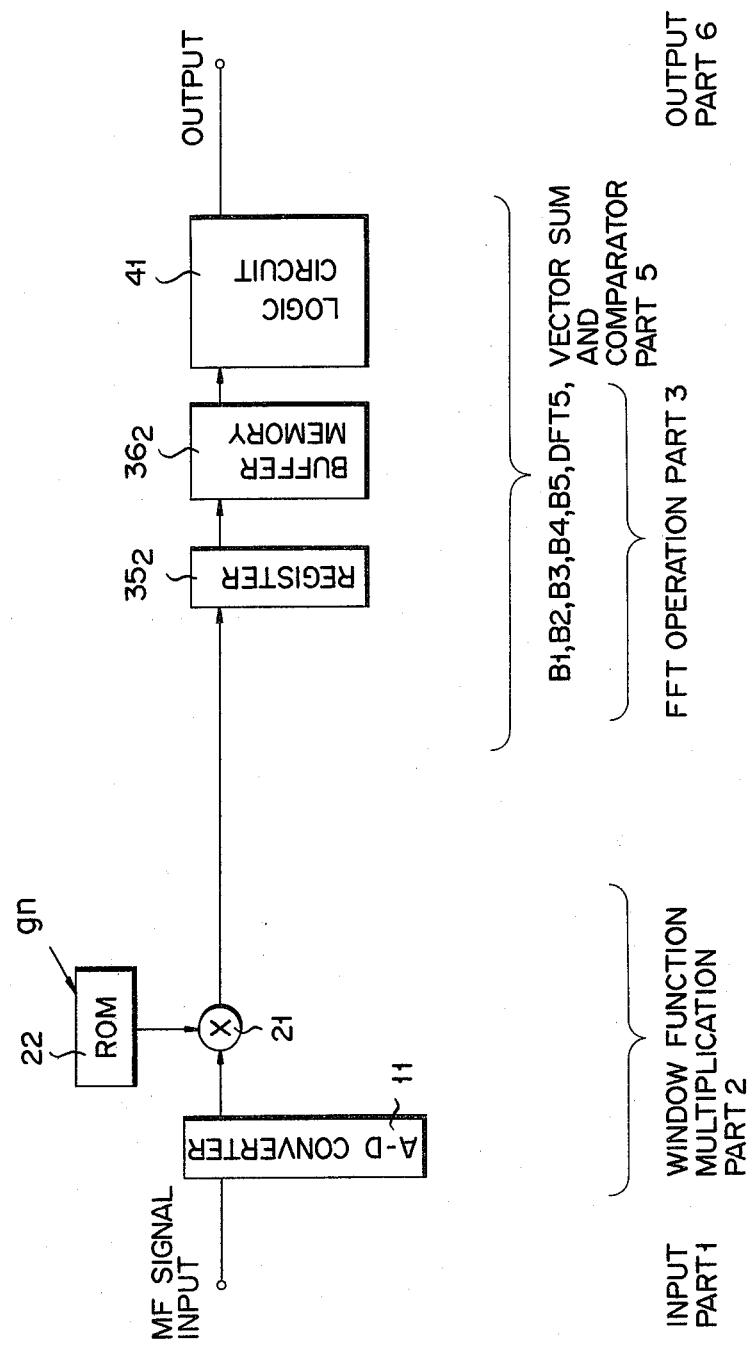
FIG. 14 is a block diagram showing an example in which part of the hardware of FIG. 13 is included in a processor.

Referring to FIG. 14, the outputs of the window function multiplication part 2 are directly applied to the register 35$_2$, whereby the operations for the difference operation part B1, registers 33 and the logic circuit 34 of the FFT operation part 3 as shown in FIG. 4 may be performed in the logic circuit 41 through a buffer memory 36$_2$.

Figure 15:
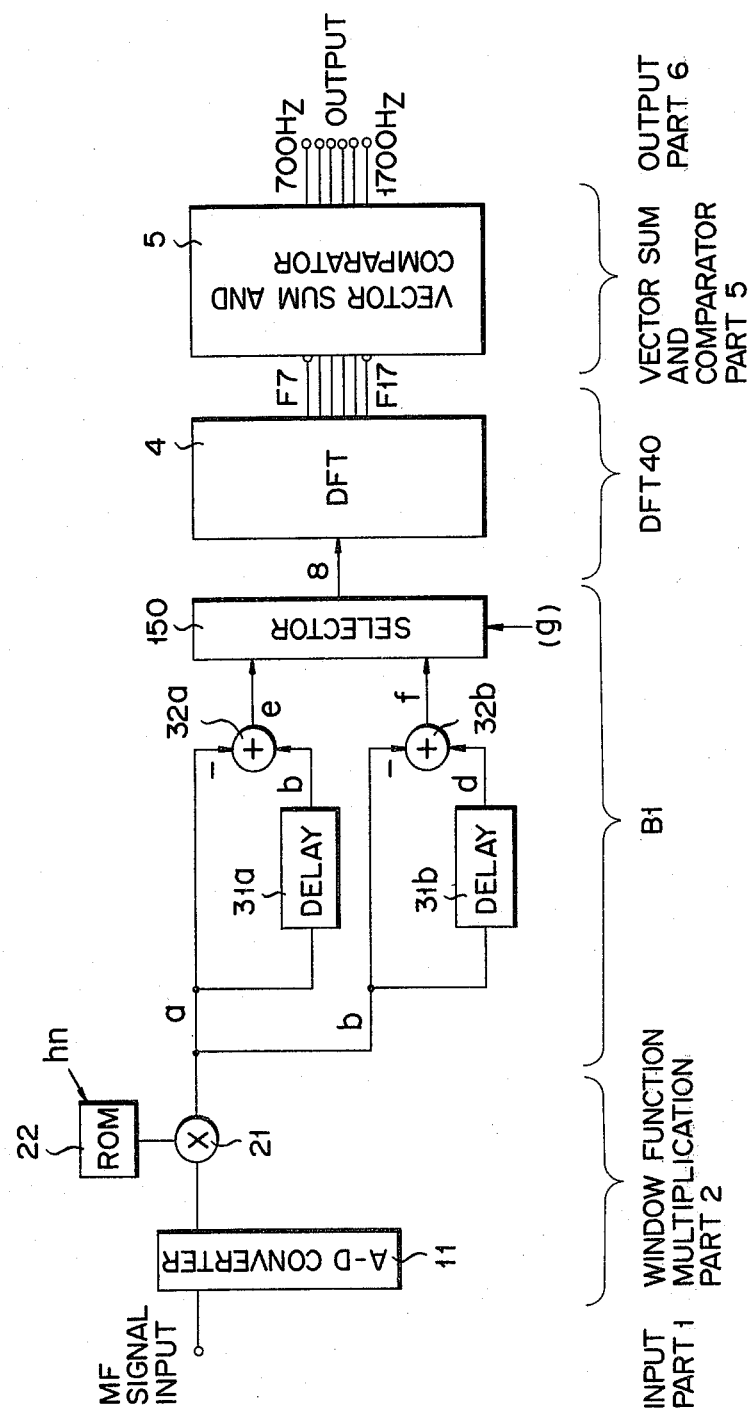
FIG. 15 shows another example of a subtractor at section B1 as shown in FIG. 4.
Figure 16:
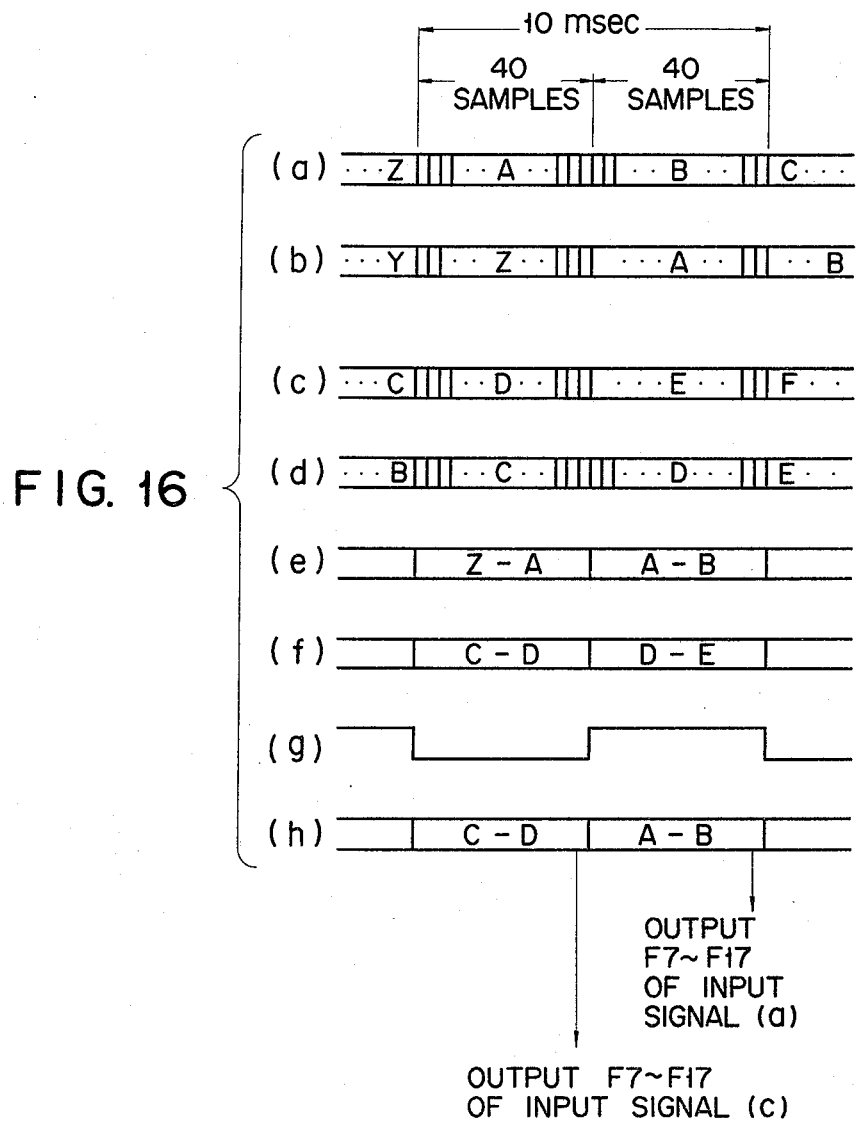
FIG. 16 is a time chart for illustrating the operation of the example of FIG. 15.

FIG. 15 shows another example of the section B1 of the FFT operation part 3 for delaying and difference operation, in which two sets of delay circuits 31$a$, 31$b$ and subtractors 32$a$, 32$b$ are connected in parallel with each other. As may be seen from the description of the section B1 with reference to FIG. 3, this is an example which enables processing of input signals with a double number of circuits, in consideration of the fact that 80-point discrete Fourier transform DFT$_{80}$ may be reduced to 40-point DFT$_{40}$ or halved in the number of operations. FIG. 16 is a time chart for such processing. Referring to FIG. 16($a$), a first MF signaling expressed by Z, A, B, each consisting of 40 samples, is applied to the subtractor 32$a$. The first MF signaling (Z, A, B) is delayed 40 samples by the delay circuit 31$a$ (FIG. 16($b$)). A second MF signaling (C, D, E) (FIG. 16($c$)) is applied to the subtractor 32$b$, and at the same time delayed 40 samples by the delay circuit 31$b$ (FIG. 16($d$)). Subtractor 32$a$ produces the difference signals (Z-A) and (A-B) (FIG. 16($e$)). The subtractor 32$b$ produces difference signals (C-D) and (D-E) (FIG. 16($f$) after subtraction. FIG. 16($g$) shows a control signal supplied to a selector 150. At its low level the control signal causes the selector 150 to select an output f from the subtractor 32$b$, while at the high level it induces the selector 150 to select an output e from the subtractor 32$a$. With an output thus obtained from the selector 150, the first MF signaling (A, B) with the samples of 10 msec is reduced to a signal (A-B) (FIG. 16($h$)) with samples of 5 msec, and the second MF signal (C, D) is also reduced to a signal (C-D) (FIG. 16($h$)) with samples of 5 msec. For each of these signals (A-B) and (C-D), 40-sample discrete Fourier transform DFT$_{40}$ is performed. Accordingly, a double number of circuits may be processed by using the conventional DFT$_{80}$.

The operation for the output of the selector 150 can be achieved by the DFT$_{40}$ and vector sum and comparator 5 according to the prior art, as shown in FIG. 15. When performing the operation in the processor 41, as shown in FIG. 13, instead of using the DFT$_{40}$, however, the function $g_n$ may be stored in the ROM of the window function multiplication part 2 for reducing the number of operations.

FIG. 17 is a specific circuit diagram showing the DFT$_{40}$ and vector sum and comparator of FIG. 15. The DFT$_{40}$ is composed of a register 171, multipliers 172 and 173 for multiplying an output from the register 171 respectively by sine and cosine components, and adders 174 and 175 and shift registers 176 and 177 provided for the respective products from the multipliers 127 and 173. In this case, the shift registers 176 and 177 have double memory capacity so that input signals for the double number of circuits may be processed in response to the use of the two sets of delay circuits and subtractors in the difference operation part B1.

Figure 18:
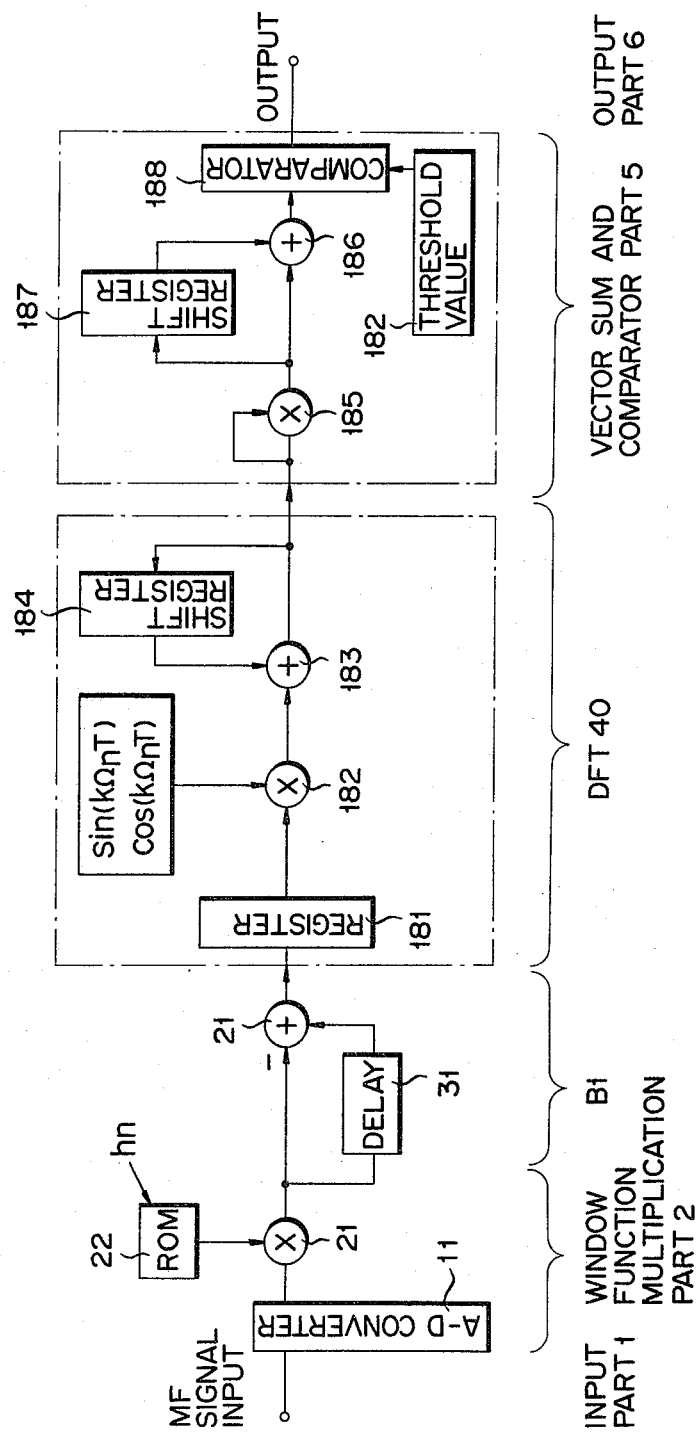
FIG. 18 is a block diagram showing still another embodiment of the invention.

FIG. 18 shows an embodiment capable of processing signals for the same number of circuits with the conventional DFT, but reduced hardware for the DFT$_{40}$. The DFT$_{40}$ is composed of a register 181, a multiplier 182 for multiplying an output from the register 181 by sine and cosine components, and an adder 183 and a shift register 184 provided for the products from the multiplier 182. In this embodiment, the 80-sample MF signal is reduced to a 40-sample MF signal by the difference operation part B1, so that the number of operations are reduced to the half of the conventional case. In this case, a multiplier 182 serially performs the multiplications by the sine and cosine components, making the most of the surplus processing time for 40 samples. The shift register 184 has a memory capacity capable of storing the sum of the multiplication values from the sine and cosine components. In the vector sum and comparator part 5 of this embodiment, the products of the output obtained from the DFT$_{40}$ and the sine and cosine components are squared by a multiplier 185 and delayed by a shift register 187, the subsequently obtained sine or cosine component is added to the cosine or sine component by an adder 186, and the output of the adder 186 is compared with an output from a threshold value generator 182. As a result, a logical level "1" is delivered if the output is larger than the threshold value, whereas a logical level "0" is delivered if the output is smaller than the threshold value.

The multipliers and adder-subtractors used in the above embodiment may be selected among those which appear in "An Approach to the Implementation of Digital Filters" (IEEE, Trans. Audio Electroacoustics, vol. AU-16 pp. 413 to 421, September, 1968) by Leland B. Jackson, James F. Kaiser and Henry S. McDonald. For the processor may be used a microcomputer, such as 8080 manufactured by Intel Corporation and M 6800 manufactured by Motorola Semiconductor Products Inc., etc.

What we claim is:

1. A digital multifrequency MF signaling receiving system comprising:
    input means to which MF signals are applied;
    first operation means for executing an operation to multiply the MF signals composed of N samples from said input means by a window function to obtain products, said window function including coefficients which are required for fast Fourier transformation of said products;
    second operation means for fast Fourier transforming of said products as sample signals, said second operation means including a difference operation means for delaying said products to halve the number of the products and delivering difference signals or N/2 sample signals representing the difference between the delayed products and the current products, and a logic circuit for executing a logical operation on the difference signals or N/2 sample signals, taking advantage of the fact that some outputs of a Fourier transform are represented as the conjugate complex of the other outputs of Fourier transform in the process of Fourier transformation for the N/2 sample signals delivered from said difference operation means;

third operation means for executing a discrete Fourier transform for said MF signal samples delivered from said logic circuit;

fourth operation means for detecting the input frequencies of said MF signal samples which are discrete-Fourier-transformed at said third operation means; and output means for delivering signals corresponding to the input frequencies of said MF signal samples detected by said fourth operation means.

2. A digital multifrequency signaling receiving system according to claim 1, wherein said input means includes an analogue-digital converter for converting the input MF signals into digital signals where said MF signals are analogue signals.

3. A digital multifrequency signaling receiving system according to claim 1, wherein said input means includes a digital interface circuit for interfacing the input MF signals with said first operation means where said MF signals are digital signals.

4. A digital multifrequency signaling receiving system according to claim 3, wherein said input means further includes a digital expander for converting the output of the digital interface circuit into linear codes where said MF signals are nonlinear-coded digital signals.

5. A digital multifrequency signaling receiving system according to claim 4, wherein said digital expander comprises ROMs (Read-Only-Memory).

6. A digital multifrequency signaling receiving system according to claim 1, wherein said first operation means includes ROMs for storing the window function and a multiplier for multiplying the MF signals delivered from said inut means by the window function read out from said ROM.

7. A digital multifrequency signaling receiving system according to claim 1, wherein said difference operation means of said second operation means comprises a delay circuit for delaying the N-sample products from said first operation means, and a subtractor for delivering differences or N/2 sample signals corresponding to the difference between the products delayed by said delay circuit and the current products.

8. A digital multifrequency signaling receiving system according to claim 1, wherein said difference operation means of said second operation means comprises a first difference operation circuit which includes a first delay circuit for delaying the first products from said first operation means and a first subtractor for delivering first difference signals corresponding to the difference between the first products delayed by said first delay circuit and the current first products, a second difference operation circuit connected in parallel with said first difference operation circuit and including a second delay circuit and a second subtractor for delivering second difference signals corresponding to the difference between the second products delayed by said second delay circuit and the current second products, and a selector for selecting one of the respective difference signals of said first and second difference operation circuits and delivering two said difference signals of N/2 samples corresponding to the said first and second difference circuits.

9. A digital multifrequency signaling receiving system according to claim 1, wherein said logic circuit of said system operation means comprises first, second, third and fourth parallel-connected registers connected to said difference operation means for storing the outputs of said difference operation means, a first logic circuit including adder-subtractors connected to said registers and adding and subtracting the output signals read out from said registers in a time division manner according to predetermined operation processes, a shift register for successively shifting four outputs produced at said first logic circuit, and a buffer memory for temporarily storing said outputs.

10. A digital multifrequency signaling receiving system according to claim 1, wherein said logic circuit of said second operation means comprises a first register group including first, second, third and fourth parallel-connected registers and a second register group including fifth, sixth, seventh and eighth parallel-connected registers connected to said difference operation means for storing the outputs of said difference operation means; first and second logic circuits each including adder-subtractors connected to the respective registers of said first and second register groups for adding and subtracting the output signals read out from said respective registers in a time division manner according to predetermined operation processes; a third logic circuit to which the output signals from said second logic circuit are applied, said third logic circuit including first, second, third and fourth multipliers and first, second, third and fourth adder-subtractors and first and second complementary circuits connected respectively to said first and third adder-subtractors; first, second, third and fourth delay circuits receiving the output signals from said first logic circuit and delaying the individual input signals correspondingly to the delay of said third logic circuit; a fourth logic circuit receiving outputs from said third logic circuit and said first, second, third and fourth delay circuits, and performing prescribed addition subtraction for the individual inputs to provide outputs represented by complex numbers; and a fifth logic circuit receiving outputs from said fourth logic circuit and including complementary circuits to perform operations with predetermined input signals as inversion outputs.

11. A digital multifrequency signaling receiving system according to claim 1 wherein said third operation means comprises a plurality of parallel-connected registers to which said MF signal samples from said logic circuit of said second operation means are applied, first and second selectors for selecting the outputs from said plurality of registers, and a logic circuit including multipliers, adders and shift registers receiving outputs from said selectors and severally performing prescribed discrete Fourier transform.

12. A digital multifrequency signal receiving system according to claim 1, wherein said fourth operation means includes a vector sum and comparator.

13. A digital multifrequency signaling receiving system according to claim 1, wherein the logic circuit of said second operation means, third and fourth operation means, and output means includes registers, buffer memories and processors.

14. A digital multifrequency signaling receiving system according to claim 1, wherein said second, third and fourth operation means and output means includes registers, buffer memories and processors.

* * * * *